US 8,134,926 B2

(12) United States Patent
Lin

(10) Patent No.: US 8,134,926 B2
(45) Date of Patent: Mar. 13, 2012

(54) METHOD FOR MONITORING AND REPORTING EVENTS BY MEDIA GATEWAYS

(75) Inventor: Yangbo Lin, Guangdong Province (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 858 days.

(21) Appl. No.: 11/404,558

(22) Filed: Apr. 14, 2006

(65) Prior Publication Data

US 2006/0233109 A1 Oct. 19, 2006

(30) Foreign Application Priority Data

Apr. 15, 2005 (CN) .......................... 2005 1 0064589

(51) Int. Cl.
*H04L 12/26* (2006.01)
(52) U.S. Cl. .................... 370/241; 370/401; 370/522
(58) Field of Classification Search .............. 370/236, 370/250, 401, 352; 379/229; 709/223, 230
See application file for complete search history.

(56) References Cited

U.S. PATENT DOCUMENTS

| | | | | |
|---|---|---|---|---|
| 6,693,897 | B1 * | 2/2004 | Huang | 370/352 |
| 6,744,768 | B2 * | 6/2004 | Vikberg et al. | 370/395.21 |
| 6,879,820 | B2 * | 4/2005 | Bjelland et al. | 455/406 |
| 6,888,839 | B1 * | 5/2005 | Scoggins et al. | 370/410 |
| 7,117,241 | B2 * | 10/2006 | Bloch et al. | 709/201 |
| 7,133,912 | B1 * | 11/2006 | Gary | 709/224 |
| 7,336,603 | B2 * | 2/2008 | Sugiyama et al. | 370/230 |
| 7,406,696 | B2 * | 7/2008 | Burger et al. | 719/318 |
| 7,415,007 | B2 * | 8/2008 | Huang | 370/352 |
| 7,564,835 | B1 * | 7/2009 | Grabelsky et al. | 370/352 |
| 2002/0027983 | A1 * | 3/2002 | Suzuki | 379/229 |
| 2002/0165961 | A1 * | 11/2002 | Everdell et al. | 709/225 |
| 2002/0176557 | A1 * | 11/2002 | Burger | 379/207.02 |
| 2002/0188713 | A1 * | 12/2002 | Bloch et al. | 709/223 |
| 2003/0053463 | A1 * | 3/2003 | Vikberg et al. | 370/395.1 |
| 2003/0126615 | A1 * | 7/2003 | Fukada | 725/111 |
| 2004/0042485 | A1 * | 3/2004 | Gettala et al. | 370/465 |
| 2004/0165531 | A1 * | 8/2004 | Brady | 370/236 |
| 2004/0218585 | A1 * | 11/2004 | Huang | 370/352 |
| 2004/0240389 | A1 * | 12/2004 | Bessis et al. | 370/252 |

(Continued)

FOREIGN PATENT DOCUMENTS

CA 2 384 989 3/2001

(Continued)

OTHER PUBLICATIONS

English Abstract of CN1533113 dated Sep. 29, 2004.

(Continued)

*Primary Examiner* — Kevin C Harper
(74) *Attorney, Agent, or Firm* — Finnegan, Henderson, Farabow, Garrett & Dunner LLP

(57) ABSTRACT

A method for monitoring and reporting events by media gateways comprising presetting the events in the media gateways, monitoring the preset events by the media gateways and reporting the monitoring result to a media gateway controller during operation. The events can include: off-hook, on-hook, dialing, hook flash, network fault, quality alarm, and timer timeout, etc. By presetting the events in the media gateways, a system problem of the media gateways not receiving the events issued by the media gateway controller for various reasons can be avoided. The media gateways can automatically monitor and report the preset events after start up, thereby, improving stability of the system.

3 Claims, 2 Drawing Sheets

U.S. PATENT DOCUMENTS

| | | | |
|---|---|---|---|
| 2006/0041439 | A1* | 2/2006 | Sreepathi-Komanduri et al. ............................ 705/1 |
| 2006/0062210 | A1* | 3/2006 | Dharanikota ................. 370/356 |
| 2006/0233109 | A1* | 10/2006 | Lin ................................. 370/236 |
| 2007/0110043 | A1* | 5/2007 | Girard ........................... 370/352 |

FOREIGN PATENT DOCUMENTS

| | | |
|---|---|---|
| CA | 2 550 291 | 3/2006 |
| CN | 1411225 | 4/2003 |
| CN | 1452347 | 10/2003 |
| CN | 1533113 | 9/2004 |
| CN | 1567905 | 1/2005 |
| EP | 1 744 488 | 1/2007 |
| JP | H03-186958 | 8/1991 |
| JP | H09-282252 | 10/1997 |
| JP | 2002-325101 | 11/2002 |
| JP | 1452347 | 10/2003 |
| JP | 2004-282556 | 10/2004 |
| WO | 2004/089003 | 10/2004 |
| WO | WO 2005/018248 | 2/2005 |

OTHER PUBLICATIONS

Office Action of Jun. 24, 2008 in corresponding Japanese application 2006-111142.

F. Andreasen, et al., "Media Gateway Control Protocol (MGCP) Version 1.0", RFC3435, Jan. 2003.

C. Aoun, et al., "A NAT package for MGCP NAT traversal", Internet Draft, Jun. 2006.

F. Andreasen; B. Foster; Cisco Systems: "Media Gateway Control Protocol (MGCP) Version 1.0; rfc3435.txt;" IETF Standard Internet Engineering Task Force, IETF, CH, Jan. 2003, pp. 1-210.

C. Auon; M. Wakley; T. Sassenberg; Nortel Networks; "A NAT package for MGCP NAT traversal, draft-aoun-mgcp-nat-package-00.txt", IETF Standard-Working-Draft, Internet Engineering Task Force, IETF, CH, Jun. 2002, pp. 1-7.

Zhengguang, W., et al. "Comparison between the Existing two Media Gateway Control Protocols for Next Generation Network." National Laboratory of Switching Technology and Telecommunications, Beijing (2004) pp. 20-23.

English Abstract of WO 2004/089003 dated Oct. 14, 2004.

English Abstract of CN 1567905 dated Jan. 19, 2005.

English Translation of the PCT Written Opinion of the International Searching Authority for International Application No. PCT/CN2006/000556, mailed Jul. 20, 2006, 5 pgs.

European Patent Office Communication in Application 0611554.9 pursuant to Article 96(2) dated Apr. 10, 2007, 5 pgs.

European Patent Office Communication in Application 06111554.9 of a Notice of Opposition dated Nov. 27, 2009, 28 pgs.

First Office Action from the Chinese Patent Office for Application No. 2005100645892, dated Dec. 22, 2006, 4 pgs., English Translation Attached.

Australia Office Action, dated May 7, 2008, 2 pgs.

Canada Office Action, dated Dec. 8, 2009, 5 pgs.

International Telecommunication Union; ITU-T ; H.248.1; Telecommunication Standardization Sector of ITU; Series H: Audiovisual and Multimedia Systems"Gateway Control Protocol, Version 2", May 2002, 148 pgs.

International Telecommunication Union; ITU-T ; H. 248.1 v.2; Telecommunication Standardization Sector of ITU; Series H: Audiovisual and Multimedia Systems, "Gateway Control Protocol, Version 2; Corrigendum 1", Mar. 2004, 41 pgs.

International Telecommunication Union; ITU-T; H.248.14; Telecommunication Standardization Sector of ITU; Series H: Audiovisual and Multimedia Systems, "Gateway Control Protocol: Inactivity Timer Package", Mar. 2002, 8 pgs.

Canadian Office Action dated Oct. 6, 2010, issued in co-pending related Canadian application No. 2 542 088, Huawei Technologies Co. Ltd.

Korean Office Action dated (mailed) Sep. 27, 2007, issued in co-pending related Korean application No. 10-2006-0033958, Huawei Technologies Co. Ltd.

Australian Examiner's First Report dated Apr. 4, 2007, issued in co-pending related Australian application No. 2006201331, Huawei Technologies Co. Ltd.

Australian Examiner's Report No. 2 dated May 7, 2008, issued in co-pending related Australian application No. 2006201331, Huawei Technologies Co. Ltd.

Aoun, C. et al., "A NAT package for MGCP NAT Traversal; draft-aoun-mgcp-nat-package-02.txt", Internet Draft, Internet Engineering Task Force, Feb. 2003, pp. 1-9.

"Gateway control protocol: Media gateway overload control package", Series H: Audiovisual and Multimedia Systems—Infrastructure of audiovisual services—Communication procedures; ITU-T Recommendation H.248.11, Nov. 2002, 16 pgs.

"Gateway control protocol: Media gateway resource congestion handling package", Series H: Audiovisual and Multimedia Systems—Infrastructure of audiovisual services—Communication procedures; ITU-T Recommendation H.248.10, Jul. 2001, 10 pgs.

Summons to attend oral proceedings pursuant to Rule 115(1) EPC dated (mailed) Nov. 11, 2010, issued in related Application No. 06111554.9-2413/1713229, filed Mar. 22, 2006, Huawei Technologies Co., Ltd.

"Provision of the minutes in accordance with Rule 124(4) EPC," dated Apr. 27, 2011 for European Patent Application No. 06 111 554.9, 22 pages.

"Decision revoking the European Patent (Art. 101(3)(b) EPC)," dated Apr. 27, 2011 for European Patent Application No. 06 111 554.9, 19 pages.

Canadian Office Action dated Oct. 18, 2011 regarding Canadian Application No. 2 542 088, 5 pages.

* cited by examiner

METHOD FOR MONITORING AND REPORTING EVENTS BY MEDIA GATEWAYS

FIELD OF THE INVENTION

The present invention relates to network communication technology and more particularly to a method for monitoring and reporting events by media gateways.

BACKGROUND OF THE INVENTION

As shown in FIG. 1, an Media Gateway Controller (MGC) and an Media Gateway (MG) are key components in an Next Generation Network (NGN). The MGC provides call control function, while the MG provides service bearing function, thereby implementing separation between call control plane and service bearing plane, and thus sharing network resources efficiently, simplifying upgrade of equipments and service expansion, and greatly reducing costs for development and maintenance.

Media Gateway Control Protocol is the main protocol between MGs and MGCs; presently, two protocols are widely used, i.e., H.248/MeGaCo and MGCP. In H.248 protocol, for example, the resources in MGs are abstracted as terminations. The terminations are categorized into physical terminations and ephemeral terminations; the former represents some semi-permanent physical entities, such as TDM channels; the latter represents some public resources that are obtained on request temporarily and then released after use, such as RTP streams. Any combination among terminations is abstracted as context. A context may include several terminations and thereby the relationship among terminations can be topologically described.

Based on above model, call switching can be regarded as an operation on terminations and contexts. Such operations are accomplished by means of command requests and responses between MGCs and MGs. Such commands carry parameters also referred as descriptors. The descriptors are categorized into property, signal, event, and statistic. Parameters with service correlation are aggregated into a package logically.

Signals are used by an MGC to instruct an MG to perform operations of corresponding resources, e.g., send dial tone, ring-back tone, or busy tone to a subscriber. Events are used by an MGC to instruct an MG to monitor corresponding status, e.g., monitor whether a subscriber hangs off, hangs up, flashes the hook, and dials a number, etc. Events are usually triggered by status change and may result in corresponding responses, e.g., the dial tone is sent to the subscriber only when the subscriber hangs off.

However, in the present definition in H.248 protocol, events have to be issued by an MGC to an MG before the MG can start monitoring the corresponding status change. The mechanism is suitable in most cases when the MGC is viewed as a controller while the MG is viewed as a controlled entity. However, in some special cases, the mechanism has some disadvantages. For instance, after the MG is successfully registered to the MGC, the MGC's activation status must be monitored immediately, which can be implemented by reporting an "Inactivity" Timeout event by the MG to trigger the MGC to feed back a response. However, in the existing H.248 protocol, if the MGC doesn't issue the event to the MG due to some causes (e.g., MGC is not configured, sudden fault, or transmission failure), the MG will not monitor the MGC's activation status. As a consequence, the MG can operate abnormally because it has lost the control of the MGC. Therefore, a breakdown can occur in a part of the network system in certain cases, thereby degrading the stability of the entire network system.

SUMMARY OF THE INVENTION

In view of above disadvantages in prior art, an object of the present invention is to provide a method for monitoring and reporting events by media gateways, so as to solve the network system problem noted herein in certain special cases when MG doesn't receive events issued by a media gateway controller, and thereby improving the stability of the network system.

A method for monitoring and reporting events by media gateways comprises the steps of presetting events to be monitored in the media gateways, monitoring the preset events by the media gateways, and reporting the monitoring result to a media gateway controller during operation.

The event presetting in the media gateways conform to the agreement between the media gateway and the media gateways.

The agreement for presetting events between the media gateway controller and the media gateways comprises complying with the same parameters and Request IDs.

During the monitoring of the preset events by the media gateways, when the media gateway controller issues events, the media gateways perform the monitoring of the events with relevant parameters and Request IDs issued from the media gateway controller instead of monitoring on the preset events.

If the events issued from the media gateway controller have a life cycle, then the media gateways performs the monitoring of the events with relevant parameters and Request IDs issued from the media gateway controller within the term of the life cycle. After the life cycle, the media gateways performs the monitoring of the presets events with relevant parameters and Request IDs.

If the events issued from the media gateway controller have no life cycle, then the media gateways performs the monitoring of the events with relevant parameters and Request IDs issued from the media gateway controller continuously.

It is appreciated that the events can be preset automatically or manually.

The system problem resulting when the events can not be issued from the MGC to the MGs due to various reasons can be avoided by presetting the events in the MGs, monitoring the status of the events automatically and reporting the monitoring results to the MGC after the MGs are started up, thereby improving the system stability.

Various other objects, advantages and features of the present invention will become readily apparent from the ensuing detailed description, and the novel features will be particularly pointed out in the appended claims.

BRIEF DESCRIPTION OF THE DRAWINGS

The following detailed description, given by way of example, and not intended to limit the present invention solely thereto, will best be understood in conjunction with the accompanying drawings in which.

DETAILED DESCRIPTION OF THE EMBODIMENT

To make those skilled in the art understand and implement the present invention, hereunder an embodiment of the present invention is described in detail with reference to the attached drawings.

In accordance with an embodiment of the present invention, events can be issued by the MGC 200 to the MGs 100 or preset in the MGs 100, so that the MGs 100 can monitor corresponding statuses, e.g., whether the subscriber hangs off, hangs up, flashes the hook, dial a number, whether there is any network fault or quality alarm, and whether the timer times out, etc. Events issued from the MGC 200 to the MGs 100 are attached with Request IDs and preferably with required parameters. Those issued events are also referred to as "requested events." Once any MG 100 detects any change in those events, the MG 100 will report the corresponding event(s) to the MGC, with the same Request ID (and the required parameters) associated with the event. The reported event is also referred to as an "observed event." The observed event correlates with the requested event by the same Request ID, while the parameters attached to them can be different.

In accordance with an embodiment of the present invention, a method automatically monitors and reports events by MGs 100, in which the events to be monitored are preset in the MGs 100. When the MGs 100 are started up, the MGs 100 monitor the preset events automatically and report the monitoring result to the MGC 200.

Figure 1:
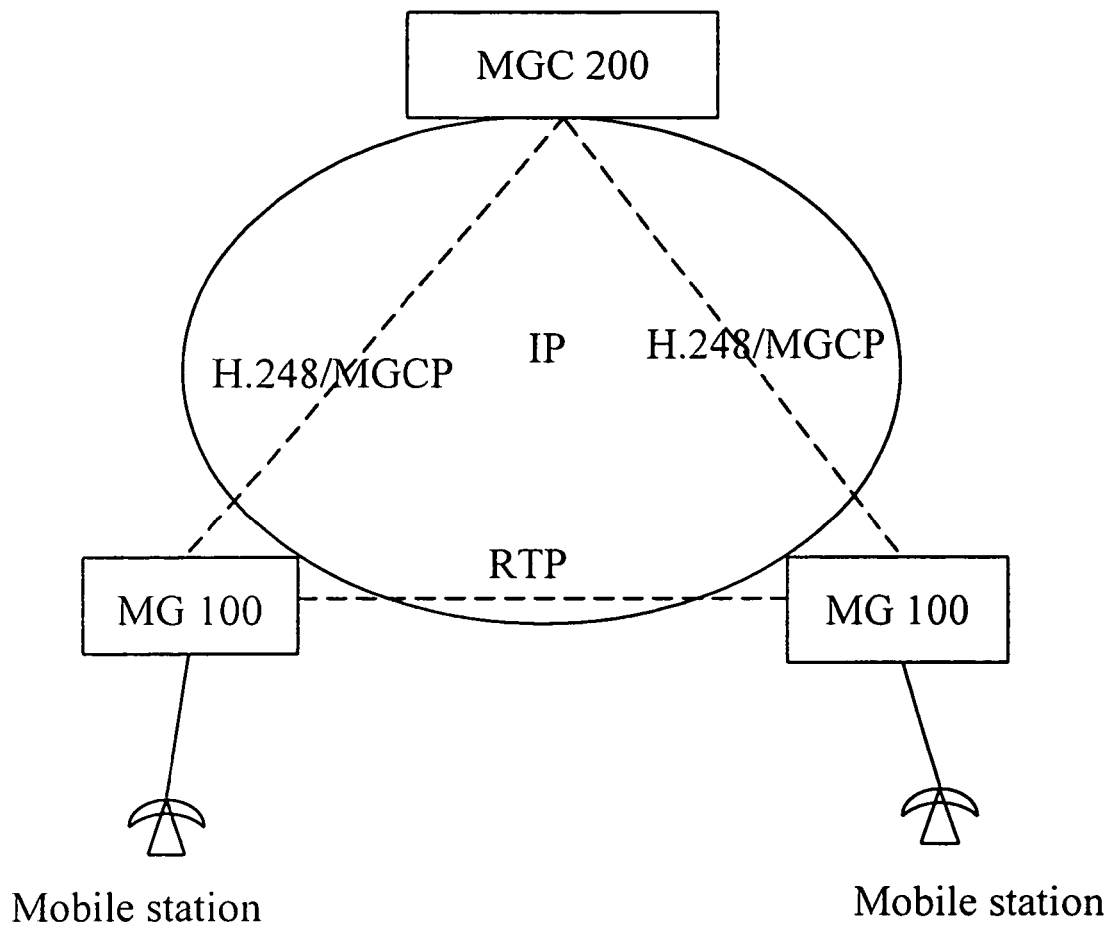
FIG. 1 is a schematic networking diagram of an MGC and MGs in a next generation network.
Figure 2:
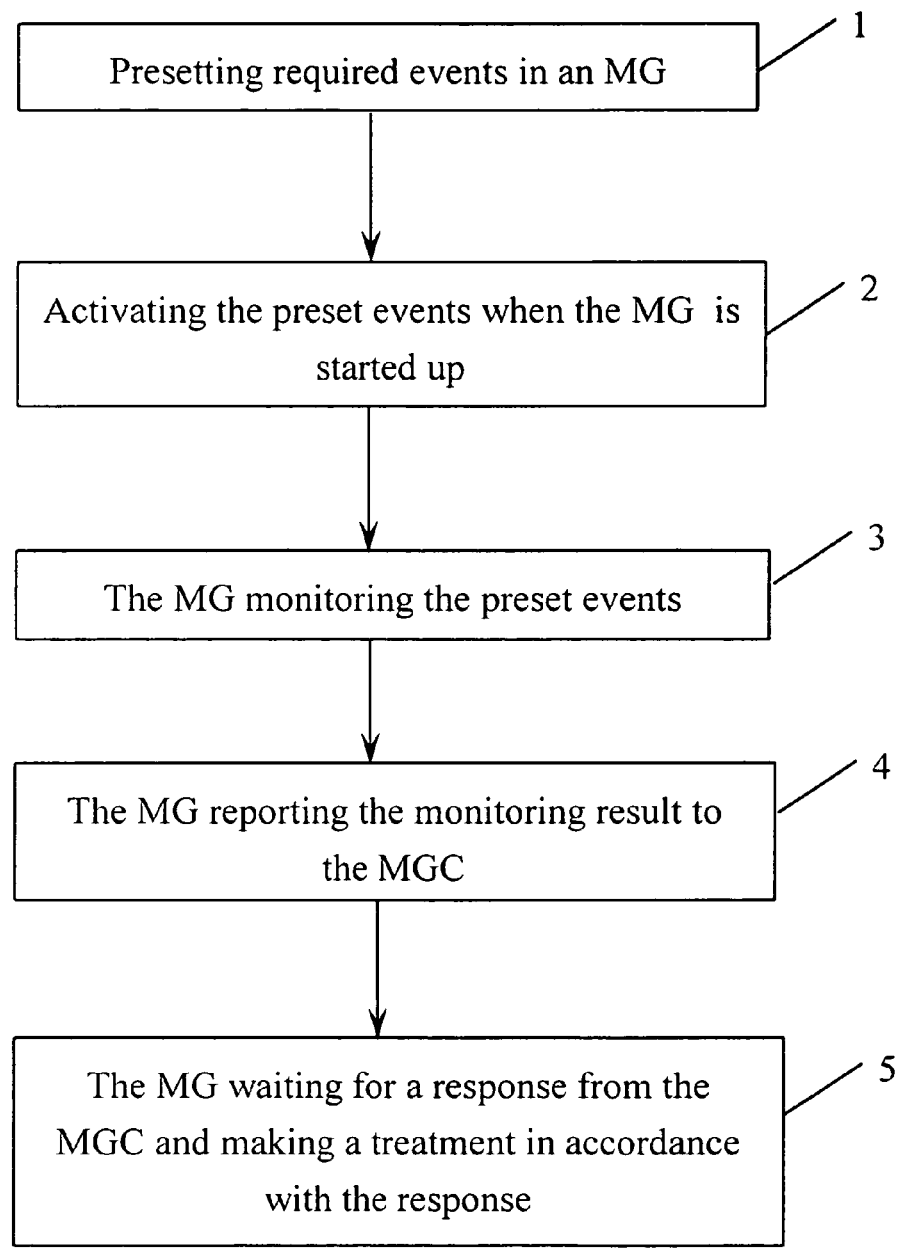
FIG. 2 is a flow chart describing the process of monitoring and reporting events in accordance with an embodiment of the present invention.

As shown in FIG. 2, a subscriber can preset in an MG 100 any event that can be monitored by the MG 100 as needed in step 1, e.g., off-hook, on-hook, dialing, flashing the hook, network fault, quality alarm, timer timeout, etc. When the MG 100 is started up, the MG 100 activates these preset events in step 2. The MG 100 monitors the preset events in step 3. The MG 100 reports that monitoring result to the MGC 200 in step 4. The MG 100 waits for a response from the MGC 200 and performs a treatment in accordance with the response from the MGC 200 in step 5. The presetting of events in the MG 100 conforms to the agreement between MGC 200 and MGs 100, such as using the same parameters and Request IDs. In this way, the MGC 200 making an improper response is minimized when receiving any report of a present event from the MG 100.

An exemplary embodiment of the present invention is described in detail with an Inactivity Timeout event (a timer timeout event, used by the MG 100 to monitor the status of the MGC 200).

When the timer is activated in the MG 100, any message from the MGC 200 to the MG 100 will cause the MG 100 to reset the timer, so that the timer will not time out. If no message is received from the MGC 200 within a predetermined period of time, the timer will timeout, and the MG 100 will report this timeout event to the MGC 200. If the MGC 200 responds to this report, this indicates that the MGC 200 is still normal (i.e., operational) and the MG 100 will continue the status detection process of the MGC 200. Otherwise, the MGC 200 is determined to be abnormal and the MG 100 activates an exception handling mechanism, for example, registering to a backup MGC 200 repeatedly or renewadly.

In accordance with an embodiment of the present invention, an Inactivity Timeout event and its parameter, Maximum Inactivity Time (e.g., 30 s), and Request ID (e.g., 0) are preset in the MG 100. After the MG 100 is started up and registers to the MGC 200 successfully, the MG 100 activates the Inactivity Timeout event. For example, the MG 100 begins to monitor messages from the MGC 200, with the value of the parameter Maximum Inactivity Time as the timing duration of the timer. In this way, the MG 100 can't receive any message from the MGC 200 to reset the timer if the MGC 200 fails. Once the timer times out, the MG 100 reports the Inactivity Timeout event to the MGC 200 with the preset Request ID. If the MGC 200 doesn't respond to the event reported from the MG 100, the MG 100 activates the exception handling mechanism, for example, registering to the backup MGC 200 repeatedly or renewadly. In this way, a potential problem that the MG 100 can't activate the monitoring of the event can be eliminated because the MGC 200 can't issue the event to the MG 100, which may result in system breakdown.

The presetting of events in the MG 100 can be performed automatically or manually, e.g., by inline code in the software, by control console, or by network management, etc.

During the monitoring of the preset events by the MG 100, if the MGC 200 issues an event that has been preset in the MG 100, the MG 100 will monitor the event based on the relevant parameters and Request ID received from the MGC 200. If the event has a life cycle, the MG 100 monitors the event with the relevant parameters and Request ID received from the MGC 200 within the term of the life cycle. After the expiration of the life cycle, the MG 100 monitors the preset event with the relevant parameters and Request ID. If the event has no life cycle, the MG 100 continuously monitors the event with the relevant parameters and Request ID received from the MGC 200.

In accordance with an embodiment of the present invention, a system breakdown problem resulting when the events can not be issued to the MG 100 by the MGC 200 for various reasons can be avoided by presetting the events in the MG 100. When MG 100 is started up, the events are automatically monitored thereby, improving the system stability and the monitoring results are reported to the MGC 200.

Though the present invention is described with reference to the above embodiment, those skilled in the art should understand that various modifications and variations can be made to the present invention, without departing from the spirit and nature of the present invention; therefore, the scope of the present invention shall be defined in the attached claims.

What is claimed is:

1. A method for monitoring and reporting events by a media gateway, comprising the steps of:
    presetting said events to be monitored in said media gateway according to a protocol for presetting said events between a media gateway controller and the media gateway before the media gateway is started up, wherein said events are parameters carried in commands of H.248 or Media Gateway Control Protocol (MGCP);
    monitoring the preset events by said media gateway;
    reporting the monitoring result to the media gateway controller when the media gateway detects said preset events during operation;
    issuing events, relevant parameters and Request IDs to the media gateway by the media gateway controller, during the monitoring of said preset events; and
    monitoring said events with said relevant parameters and said Request IDs received from said media gateway controller,
    wherein said events received from said media gateway controller have a life cycle and monitoring said events with said relevant parameters and said Request IDs received from said media gateway controller comprises monitoring said events with said relevant parameters and said Request IDs received from said media gateway controller within said life cycle.

2. A method for monitoring and reporting events by a media gateway, comprising the steps of:
presetting said events to be monitored in said media gateway according to a protocol for presetting said events between a media gateway controller and the media gateway before the media gateway is started up, wherein said events are parameters carried in commands of H.248 or Media Gateway Control Protocol (MGCP);
monitoring the preset events by said media gateway;
reporting the monitoring result to the media gateway controller when the media gateway detects said preset events during operation;
issuing events, relevant parameters and Request IDs to the media gateway by the media gateway controller, during the monitoring of said preset events; and
monitoring said events with said relevant parameters and said Request IDs received from said media gateway controller,
wherein said events received from said media gateway controller have a life cycle, and monitoring said events with said relevant parameters and said Request IDs received from said media gateway controller comprises monitoring said preset events with said relevant parameters and said Request IDs preset in the media gateway after the expiration of said life cycle.

3. A communication system, comprising a media gateway controller and a media gateway,
wherein the media gateway is configured to:
monitor events which are preset to be monitored in the media gateway according to a protocol for presetting the events between the media gateway controller and the media gateway before the media gateway is started up, wherein said events are parameters carried in commands of H.248 or Media Gateway Control Protocol (MGCP); and
monitor the preset events and report the monitoring result to the media gateway controller when the media gateway detects said preset events during operation;
wherein the media gateway controller is configured to issue the events, relevant parameters and Request IDs to the media gateway during the monitoring of the preset events; and
wherein the media gateway is further configured to monitor the events with the relevant parameters and the Request IDs received from the media gateway controller.
wherein the events received from the media gateway controller have a life cycle and the media gateway is configured to monitor the events received from the media gateway controller with the relevant parameters and the Request IDs received from said media gateway controller within the life cycle.

* * * * *